United States Patent [19]
Yatka et al.

[11] Patent Number: 5,399,365
[45] Date of Patent: Mar. 21, 1995

[54] CHEWING GUM CONTAINING PALATINOSE AND/OR PALATINOSE OLIGOSACCHARIDE

[75] Inventors: Robert J. Yatka, Orland Park; Lindell C. Richey, Lake Zurich, both of Ill.

[73] Assignee: Wm. Wrigley Jr. Company, Chicago, Ill.

[21] Appl. No.: 167,938
[22] PCT Filed: Jun. 19, 1992
[86] PCT No.: PCT/US92/05217
§ 371 Date: Dec. 16, 1993
§ 102(e) Date: Dec. 16, 1993
[87] PCT Pub. No.: WO92/22217
PCT Pub. Date: Dec. 23, 1992
[51] Int. Cl.$^6$ .............................................. A23G 3/30
[52] U.S. Cl. ....................................... 426/3; 426/548; 426/658
[58] Field of Search ........................ 426/3-6, 426/548, 658, 804

[56] References Cited

U.S. PATENT DOCUMENTS

| | | | |
|---|---|---|---|
| 3,865,957 | 2/1975 | Schieweck et al. | 426/213 |
| 3,912,804 | 10/1975 | Schiweck | 424/9 |
| 4,087,460 | 2/1992 | Cherukuri et al. | 426/5 |
| 4,233,439 | 11/1980 | Schiweck et al. | 426/548 |
| 4,359,531 | 11/1982 | Bucke et al. | 426/658 |
| 4,382,963 | 5/1983 | Klose et al. | 426/3 |
| 4,556,429 | 12/1985 | Takazoe et al. | 426/658 |
| 4,587,119 | 5/1986 | Bucke et al. | 426/3 |
| 4,695,326 | 9/1987 | Takazoe et al. | 426/658 |
| 4,765,991 | 8/1988 | Cherukuri et al. | 426/3 |
| 4,786,722 | 11/1988 | Zehner | 426/658 |
| 4,792,453 | 12/1988 | Reed et al. | 426/5 |

(List continued on next page.)

FOREIGN PATENT DOCUMENTS

| | | |
|---|---|---|
| 0325090A2 | 7/1989 | European Pat. Off. |
| 0351972A1 | 1/1990 | European Pat. Off. |
| 0351973A2 | 1/1990 | European Pat. Off. |
| 0390438A1 | 10/1990 | European Pat. Off. |
| 0483755A2 | 5/1992 | European Pat. Off. |

(List continued on next page.)

OTHER PUBLICATIONS

Chapter 6, Palatinose-An Isomeric Alternative to Sucrose, by Ichiro Takazoe, from a book entitled, *Progress in Sweeteners*, edited by T. H. Grenby, 1989, pp. 143–167.

"Coloration and Other Chemical Changes in the Manufacture of Palatinose Candy," by Yoshikazu Nakajima and Takeo Mizutani, translated from the *Journal of the Society for Research into Sugar Refining Techniques*, No. 36, pp. 95–103 (1988).

"Production and Properties of Palatinose-Oligosaccharide," by Kazui Ogasa, Akio Masubuchi, Takeo Mizutani, Yoshikazu Nakajima and Koji Nishio, translated from the *Journal of the Society for Research into Sugar Refining Techniques*, No. 37, pp. 85–91 (1989).

"Properties and Use of Palatinose-Oligosaccharide," by Takeo Mizutani, translated from *New Food Industry*, vol. 33, No. 2 (1991).

"Production and Application of Palatinose-Oligosaccharide," by Takeo Mizutani, Mitsui Sugar Co., Ltd., translated from Gekkan Fudo Kemikaru, Oct. 1989, pp. 67–72.

*Primary Examiner*—Jeanette Hunter
*Attorney, Agent, or Firm*—Steven P. Shurtz

[57] ABSTRACT

Chewing gum products containing palatinose and/or palatinose oligosaccharide and methods of making such gum products are disclosed. In one embodiment, the palatinose and/or palatinose oligosaccharide are used in a rolling compound applied to the chewing gum product. In a second embodiment, the palatinose and/or palatinose oligosaccharide are used in a coating, such as a hard-shell coating, for a pellet gum. In a third embodiment, aspartame is used to sweeten the gum composition, and palatinose oligosaccharide is provided in an effective amount to stabilize the aspartame such that after four weeks of storage at 85° F., at least 10% more aspartame remains undecomposed than would have remained if the palatinose oligosaccharide were not included. Palatinose oligosaccharide is also used as an encapsulating agent for high-intensity sweeteners or flavors used in gum compositions.

10 Claims, 3 Drawing Sheets

U.S. PATENT DOCUMENTS

| | | | |
|---|---|---|---|
| 4,883,685 | 11/1989 | Kondou | 426/658 |
| 4,908,212 | 3/1990 | Kwon et al. | 426/3 |
| 4,948,616 | 8/1990 | Iijima et al. | 426/658 |
| 4,961,935 | 10/1990 | Cherukuri et al. | 426/3 |
| 4,976,972 | 12/1990 | Patel et al. | 426/3 |
| 4,980,127 | 12/1990 | Parris et al. | 420/418 |
| 4,983,405 | 1/1991 | Cherukuri et al. | 426/3 |
| 4,988,518 | 1/1991 | Patel et al. | 426/5 |
| 4,997,659 | 3/1991 | Yatka et al. | 426/548 |
| 5,041,293 | 8/1991 | Patel et al. | 426/3 |
| 5,135,761 | 8/1992 | Dave et al. | 426/5 |
| 5,296,244 | 3/1994 | Yatka | 426/5 |
| 5,298,263 | 3/1994 | Yatka et al. | 426/5 |

FOREIGN PATENT DOCUMENTS

| | | |
|---|---|---|
| 57-86246 | 9/1982 | Japan . |
| 58-138355 | 8/1983 | Japan . |
| 59-173066 | 9/1984 | Japan . |
| 60-9466 | 1/1985 | Japan . |
| 60-248137 | 12/1985 | Japan . |
| 62-148496 | 7/1987 | Japan . |
| 1-19860 | 4/1989 | Japan . |
| 3-39100 | 2/1991 | Japan . |
| 3-240463 | 10/1991 | Japan . |
| 4-312595 | 11/1992 | Japan . |
| 4-316455 | 11/1992 | Japan . |
| 2063268 | 6/1981 | United Kingdom . |
| 2066639 | 7/1981 | United Kingdom . |
| 2223944 | 4/1990 | United Kingdom . |
| WO90/06317 | 6/1990 | WIPO . |
| WO91/15941 | 10/1991 | WIPO . |
| WO92/22217 | 12/1992 | WIPO . |

CHEWING GUM CONTAINING PALATINOSE AND/OR PALATINOSE OLIGOSACCHARIDE

CROSS REFERENCE TO RELATED APPLICATION

The present application is a 371 of PCT/US 92/05217,filed Jun. 19, 1992 and a continuation-in part of application Ser. No. PCT/US 91/04349, filed as a PCT application on Jun. 19, 1991. That application, published as WO 91/15941, is incorporated herein by reference.

BACKGROUND OF THE INVENTION

The present invention relates to improved compositions of chewing gum. More particularly, the invention relates to improving chewing gum by the use of specific bulking agents in sugar and non-sugar chewing gum products to give improved texture, moisture absorption properties, and improved shelf-life properties. The improved chewing gum compositions may also be used in a variety of chewing gum products such as confectionery coated chewing gum products.

In recent years, efforts have been devoted to replace sugar and sugar syrups normally found in chewing gum with other carbohydrates and non-carbohydrates. Non-sugar or sugar-free chewing gum, which is growing in popularity, uses sugar alcohols or polyols to replace sugar and sugar syrups. The most popular polyols are sorbitol, mannitol, and xylitol. New polyols are being developed using new technology to replace these polyols. New polyols have various unique properties which can improve the taste, texture, and shelf-life properties of chewing gum for consumers.

The non-sugar polyols have the advantage of not contributing to dental caries of consumers, as well as being able to be consumed by diabetics. However, all polyols have the disadvantage of causing gastrointestinal disturbances if consumed in too great of a quantity. Therefore it would be a great advantage to be able to use a carbohydrate or carbohydrate-like food ingredient for chewing gum that would act as a bulking agent, but not contribute to dental caries nor cause gastrointestinal disturbances.

One such bulking agent is called palatinose or isomaltulose. This bulking agent or bulk sweetener, which is not approved for use in food products or in chewing gum in the U.S., is being considered by the USFDA for GRAS Affirmation. The bulk sweetener is approved for use in Japan and is being used in chewing gum. Although a sugar, palatinose does not contribute to dental caries, nor does it cause gastrointestinal disturbances. Thus, this ingredient's use in chewing gum could be a definite improvement.

The manufacture of palatinose is disclosed in UK Pat. No. 2,063,268, Japanese Patent No. 87-148496, and U.S. Pat. No. 4,359,531.

UK Patent No. 2,066,639 discloses the replacement of sucrose with palatinose in various food products.

Combinations of palatinose with high-potency sweeteners are disclosed in EPO Publication No. 0 390 438 (using sucralose) and Japanese Patent No. 83-138355 (using aspartame).

Results of cariogenic studies of palatinose are disclosed in U.S. Pat. No. 4,556,429; 4,587,119 and 4,695,326. Palatinose inhibits the formation of insoluble glucon from sucrose and thus reduces dental plaque.

The use of palatinose in chewing gum is disclosed in Japanese Patent No. 85-248137 and 89-019860.

Other patents disclose how bulking agents may be used in chewing gum to modify texture, flavor, and shelf-life properties.

For example, U.S. Pat. No. 4,983,405 discloses the method of adding bran fiber to chewing gum to reduce calories.

U.S. Pat. No. 4,980,127 discloses a high gum base, low bulking agent composition giving a low caloric, saliva stimulating chewing gum using a sodium carboxymethyl cellulose carrier.

U.S. Pat. No. 4,961,935 discloses a composition of anhydrous chewing gum containing a nonhygroscopic bulking agent called palatinit, which is hydrogenated palatinose.

U.S. Pat. No. 4,786,722 discloses D-Tagatose as a naturally occurring bulking agent for use in chewing gum.

U.S. Pat. No. 4,765,991 discloses the use of polydextrose with a PVA base in a reduced calorie chewing gum. U.S. Patent No. 4,382,963 discloses polydextrose used in chewing gum with snack-type flavors.

PCT Publication No. 90-006317 discloses the use of crystalline lactitol monohydrate sweetener as a sugar replacement for dietetic foods, including chewing gum.

EPO Publication Nos. 0 351 972 and 0 351 973 disclose the use of sweet and non-sweet bulking agents in a savory, meat-like flavored chewing gum.

EPO Publication No. 0 325 090 discloses a sugarless anhydrous chewing gum containing maltitol.

SUMMARY OF THE INVENTION

Chewing gum products containing palatinose and/or palatinose oligosaccharide and methods of making such gum products have been invented. In one embodiment, the palatinose and/or palatinose oligosaccharide are used in a rolling compound applied to the chewing gum product. In a second embodiment, the palatinose and/or palatinose oligosaccharide are used in a coating, such as a hard-shell coating, for a pellet gum. In a third embodiment, aspartame is used to sweeten the gum composition, and palatinose oligosaccharide is provided in an effective amount to stabilize the aspartame such that after four weeks storage at 85° F., at least 10% more aspartame remains undecomposed than would have remained if the palatinose oligosaccharide were not included. Palatinose oligosaccharide is also used as an encapsulating agent for high-intensity sweeteners or flavors used in gum compositions. Even though palatinose and palatinose oligosaccharide are very similar to sucrose, they are not cariogenic, nor do they cause gastrointestinal disturbances, giving a highly consumer-acceptable chewing gum product.

DETAILED DESCRIPTION OF THE PREFERRED EMBODIMENTS

Figure 1:
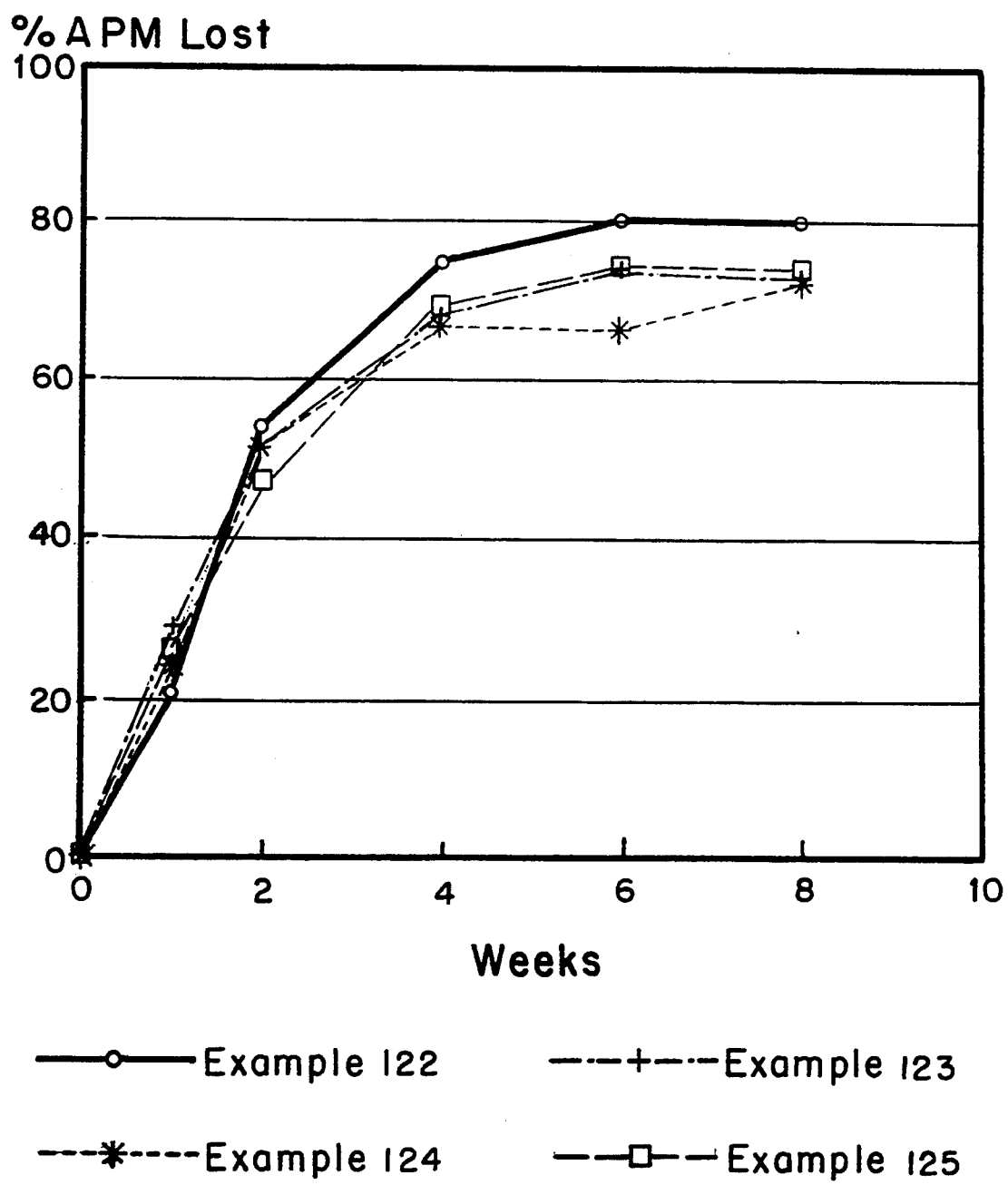
FIG. 1 shows test results of aspartame stability for gum made with palatinose.

As used herein, the term "chewing gum" also includes bubble gum and the like. Unless otherwise specified, all percentages used herein are weight percents.

Palatinose is a carbohydrate bulking agent that is similar to sucrose, but low in sweetness intensity. Although palatinose is an isomer of sucrose, its sweetness intensity is only 42% of sucrose. Palatinose, also known as isomaltulose, is a crystalline reducing disaccharide with an $\alpha$-1,6 bond between glucose and fructose. The chemical name for palatinose is 6-0-$\alpha$-D-glucopyranosyl-D-fructose.

More information on palatinose can be found in *Progress in Sweeteners*, edited by T. H. Grenby, published by Elsevier Science Publishers, Ltd., England in 1989, Chapter 6.

Palatinose crystallizes with one water molecule per palatinose molecule, but the dehydrated form is not crystalline. Including water of crystallization, the molecular weight is 360. The melting point is 122°–123° C., which is much lower than sucrose at 182° C.

The United States Food and Drug Administration is now considering palatinose under a GRAS Affirmation petition. In Japan, palatinose is considered a food item. Palatinose is being marketed in the United States by Mitsui Sugar Co., Inc. of Tokyo, Japan. It is also available from Palatinit Sussungsmittel GmbH through its U.S. representative in Elkhart, Indiana.

Palatinose is available as a crystalline material that is 99% pure with its water of crystallization. In a variety of cariogenicity tests, pure palatinose has been found to be non-cariogenic. Palatinose is also available as a palatinose syrup composed of palatinose, trehalulose, and other carbohydrates. This syrup, however, is considered low-cariogenic. Palatinose has also been polymerized to yield another similar bulking agent ingredient, called palatinose-oligosaccharide (POS). POS is considered similar to palatinose in that it is non-cariogenic. Any of these three forms of palatinose may be used in chewing gum, but the preferred form is POS when used with aspartame.

Commercially available POS, on a dry solids basis, is 48% palatinose and 50% oligosaccharides made by palatinose repolymerization with citric acid. It contains less than 5% moisture and has unique physical properties in that it is very hygroscopic, has low sweetness, has high water solubility, and is very thermostable.

Palatinose may be added to chewing gum in its crystalline/solid form or may be dissolved in water. Its solubility in water is about 30% at room temperature, but increases with increased temperature to about 65% at 80° C. Palatinose may be used in chewing gum as a texture and flavor modifier, bulking agent, and may improve texture, flavor, and shelf-life properties. Palatinose may replace solids like sucrose, dextrose, or lactose when used in its powder form, or may replace syrups when used in its liquid or syrup form. At levels of about 0.5% to about 25%, palatinose or POS may replace part of the solids in sugar gum or, as a liquid, all or part of the syrup in sugar gum. At higher levels of about 25% to about 90% of the gum formulation, palatinose and/or POS may replace all of the solids in a chewing gum formulation.

POS may be added to chewing gum in its powder form or dissolved in water. POS may be used as a texture and flavor modifier, bulking agent, and may improve texture, flavor and shelf-life properties. In its powder or liquid form, a sufficient quantity of POS can also stabilize aspartame. POS may replace solids like sucrose or dextrose in its powder form, or replace syrups in its liquid or syrup form. At levels above 10%, POS may replace significant quantities of sucrose and syrup. Because of its lower sweetness, aspartame may be added. It has been found that aspartame is stabilized with POS, especially when the POS is used at a level of 10% or more of the gum. In preferred embodiments, an effective amount of POS is used in gums with sweetness imparting amounts of aspartame to stabilize the aspartame against decomposition during storage at 85° F. for four weeks whereby at least 10% more aspartame remains undecomposed into non-sweetening derivatives than would have remained undecomposed if the POS were not included in the gum composition.

Although palatinose and POS are similar to sucrose and glucose polymers, their unique anti-caries properties suggest that they may be used in chewing gum formulations containing non-sugar ingredients. Non-sugar ingredients are alditols such as sorbitol, mannitol, xylitol, lactitol, palatinit (Isomalt), maltitol, and hydrogenated starch hydrolyzates. These alditols are used in a variety of combinations to develop unique sugarless chewing gum formulations. Palatinose and POS may be used to replace the individual alditols or combinations of alditols. With partial replacement of one or more alditols, palatinose or POS can be used at levels of about 0.5–25%. If palatinose and POS replace a large amount or most of the alditols, this level may be about 25% to about 90% of the gum formulation.

Some sugar-free chewing gum formulations contain high levels of glycerin and are very low in moisture, i.e., less than about 2%. POS as a powder or liquid may replace part or all of the glycerin used in these types of formulations. At higher moisture levels (more than 2%) in sugar-free gum, a liquid sorbitol (70% sorbitol, 30% water) is used. When using POS, preferably sorbitol liquid should also be used to obtain soft textured gum formulations. Previous high moisture formulations containing liquid sorbitol were not made with aspartame, since the moisture caused degradation of aspartame. However, when sufficient POS (generally greater than about 10%) is added to a high moisture gum, aspartame is stabilized, and degradation is reduced or eliminated.

Recent advances use hydrogenated starch hydrolyzates (HSH) and glycerin preblended and coevaporated to reduce moisture in some sugar-free gum formulations. Palatinose or POS may be used to replace part or all of the HSH/glycerin blends in such chewing gum formulations. Aqueous palatinose or POS solids and/or POS syrup may also replace HSH in the preblend with glycerin and be co-evaporated with glycerin to obtain a low moisture, non-crystallizable blend. Combinations of palatinose or POS solids/syrup with alditols like sorbitol, maltitol, xylitol, lactitol and mannitol in aqueous form may also be blended with glycerin and co-evaporated for use in low-moisture, sugar-free gum.

Palatinose or POS may be used in gum formulations with hydrogenated starch hydrolysates (HSH) without preblending with glycerin and coevaporation. Low levels of moisture are not necessary to prevent degradation of aspartame when POS is used, so HSH syrups at about 20–30% moisture do not need to be modified to reduce moisture to improve aspartame stability.

Palatinose or POS bulk sweetener may also be co-dried with a variety of sugars such as sucrose, dextrose, lactose, fructose, and corn syrup solids and used in a sugar-containing gum formulation. Palatinose or POS may be co-dried with a variety of alditols such as sorbitol, mannitol xylitol, maltitol, palatinit and hydrogenated starch hydrolyzates and used in a sugar-free gum formulation. Co-drying refers to methods of co-crystallization and co-precipitation of palatinose or POS with other sugars and alditols, as well as co-drying by encapsulation, agglomeration, and absorption with other sugars and alditols.

Co-drying by encapsulation, agglomeration, and absorption can also include the use of encapsulating and agglomerating agents. Palatinose or POS may be mixed with other sugars or alditols prior to being co-dried by encapsulation or agglomeration, or may be used alone with the encapsulating and agglomerating agents. These agents modify the physical properties of the bulk sweetener and control its release from chewing gum.

Three methods to obtain a controlled release of bulk sweetener are: (1) encapsulation by spray drying, fluid-bed coating, spray chilling and coacervation to give full or partial encapsulation, (2) agglomeration to give partial encapsulation and (3) fixation or entrapment/absorption which also gives partial encapsulation. These three methods, combined in any usable manner which physically isolates the bulk sweetener, reduces its dissolvability or slows down the release of bulk sweetener, are included in this invention.

POS may act as an encapsulating or agglomerating agent. POS may also be used to absorb other ingredients. POS may be able to encapsulate, agglomerate or entrap/absorb flavors and high-intensity sweeteners like aspartame, alitame, cyclamic acid and its salts, saccharin acid and its salts, acesulfame and its salts, sucralose, dihydrochalcones, thaumatin, monellin or combinations thereof. Encapsulation of high-intensity sweeteners with POS may improve the sweetener's shelf-life.

POS may be used with other bulk sweeteners and in combination give unique properties. POS may be co-dried by various delayed release methods noted above with other bulk sweeteners like sucrose, dextrose, lactose, maltose, fructose, corn syrup solids, sorbitol, mannitol, xylitol, maltitol, palatinit and hydrogenated starch hydrolysates for use in sugar and sugar-free chewing gum. Ingredients, including flavors, co-dried, encapsulated, agglomerated or absorbed on POS may show faster release. However, encapsulation of flavors with POS may improve the shelf-life of the flavor ingredient.

Other methods of treating the palatinose or POS bulk sweetener to physically isolate the sweetener from other chewing gum ingredients may also have some effect on its release rate and its effect on chewing gum flavor and texture. The bulk sweetener may be added to the liquid inside a liquid center gum product. The center fill of a gum product may comprise one or more carbohydrate syrups, glycerin, thickeners, flavors, acidulants, colors, sugars and sugar alcohols in conventional amounts. The ingredients are combined in a conventional manner. The bulk sweetener is dissolved in the center-fill liquid and the amount of bulk sweetener added to the center-fill liquid may be about 0.1% to about 20% by weight of the entire chewing gum formula. This method of using the bulk sweetener in chewing gum can allow for a lower usage level of the bulk sweetener, can give the bulk sweetener a smooth release rate, and can reduce or eliminate any possible reaction of the bulk sweetener with gum base, flavor components or other components, yielding improved shelf stability.

Another method of isolating the palatinose or POS bulk sweetener from other chewing gum ingredients is to add palatinose or POS to the dusting compound of a chewing gum. A rolling or dusting compound is applied to the surface of chewing gum as it is formed. This rolling or dusting compound serves to reduce sticking to machinery as it is formed, reduces sticking of the product to machinery as it is wrapped, and sticking to its wrapper after it is wrapped and being stored. The rolling compound comprises palatinose or POS bulk sweetener alone or in combination with mannitol, sorbitol, sucrose, starch, calcium carbonate, talc, other orally acceptable substances or a combination thereof. The rolling compound constitutes from about 0.25% to about 10.0%, but preferably about 1% to about 3% of weight of the chewing gum composition. The amount of palatinose or POS sweetener added to the rolling compound is about 0.5% to 100% of the rolling compound or about 0.005% to about 5% of the chewing gum composition. This method of using palatinose or POS bulk sweetener in the chewing gum can allow a lower usage level of the bulk sweetener, can give the bulk sweetener a more controlled release rate, and can reduce or eliminate any possible reaction of the bulk sweetener with gum base, flavor components, or other components, yielding improved shelf stability.

Another method of isolating palatinose or POS sweetener is to use them in the coating/panning of a pellet chewing gum. Pellet or ball gum is prepared as conventional chewing gum, but formed into pellets that are pillow shaped or into balls. The pellets/balls can then be coated or panned by conventional panning techniques to make a unique coated pellet gum.

Conventional panning procedures generally apply a liquid coating to a pellet, which is then solidified, usually by drying the coating. The coating layer is built up by successive coating and drying steps.

Palatinose and POS are very stable and highly water soluble, and can be easily added to a sugar solution prepared for sugar panning. Palatinose may be combined with sucrose or used alone in solution as the coating on pellet gum. POS may also be added as a liquid form to the palatinose coating or any other sugar or alditol coating. Palatinose or POS can also be added as a powder blended with other powders often used in some types of conventional panning procedures. Using palatinose or POS sweetener isolates it from other gum ingredients and modifies its release rate in chewing gum. Levels of use of palatinose or POS may be about 1% to about 100% in the coating and about 0.5% to about 50% of the weight of the chewing gum product. The weight of the coating may be about 20% to about 50% of the weight of the finished gum product.

Conventional panning procedures generally coat with sucrose, but recent advances in panning have allowed the use of other carbohydrate materials to be used in the place of sucrose. Some of these components include, but are not limited to, dextrose, maltose, xylitol, lactitol, palatinit and other new alditols or a combination thereof. These materials may be blended with panning modifiers including, but not limited to, gum arabic, maltodextrins, corn syrup, gelatin, cellulose derivatives like carboxymethyl cellulose or hydroxymethyl cellulose, starch and modified starches, vegetable gums like alginates, locust bean gum, guar gum, and gum tragacanth, insoluble carbonates like calcium carbonate or magnesium carbonate and talc. Antitack agents may also be added as panning modifiers which allow the use of a variety of carbohydrates and sugar alcohols to be used in the development of new panned or coated gum products. Flavors may also be added with the sugar coating and with the palatinose or POS bulk sweetener to yield unique product characteristics.

Crystalline or powdered palatinose is 99% pure and may be used alone to coat chewing gum pellets. It may be combined with panning modifiers to strengthen the resulting hard shell or used with antitack agents to reduce sticking. Panning tests have shown crystalline palatinose obtained from Mitsui Sugar Co. of Japan is slightly tacky for coating. There are two possible reasons for this. First, other saccharide impurities may cause palatinose to be tacky, and slow its crystallization during coating. If this were the reason, a more pure palatinose would be easy to use to make a coated pellet gum. Secondly, upon being dried from an aqueous solution, as previously noted, palatinose forms a monohydrate. Thus, during the coating operation, the palatinose may dry to a monohydrate initially, then release its moisture later. This is easily overcome by not allowing previous coatings to completely dry between applications of liquid palatinose syrup. After the final coatings are applied, further drying is done by holding pellets in open containers to allow complete crystallization and formation of a hard shell. This is very similar to procedures used for dextrose panning.

Another method to improve coating processes using palatinose is to add a powder coating after a liquid coating. The powder coating may include palatinose, POS, maltodextrin, gelatin, cellulose derivatives, starches, modified starches, vegetable gums, and fillers like talc and calcium carbonate. This will reduce stickiness and allow a faster build-up of coating.

POS may be used in combination with powdered palatinose in a liquid syrup to coat pellet gum. POS may also be used as a panning modifier with other sugar and sugar alcohol syrups such as dextrose, sucrose, xylitol, and palatinit. POS may act as a binder to, and film former for, the sugar or sugar alcohol coating.

The previously described palatinose or POS bulk sweetener may readily be incorporated into a chewing gum composition. The remainder of the chewing gum ingredients are noncritical to the present invention. That is, the bulk sweetener can be incorporated into conventional chewing gum formulations in a conventional manner. The palatinose or POS bulk sweeteners may be used in a sugar-free or sugar chewing gum to modify the sweetness thereof. The bulk sweetener may be used in either regular chewing gum or bubble gum.

In general, a chewing gum composition typically comprises a water-soluble bulk portion, a water-insoluble chewable gum base portion and typically water-insoluble flavoring agents. The water-soluble portion dissipates with a portion of the flavoring agent over a period of time during chewing. The gum base portion is retained in the mouth throughout the chew.

The insoluble gum base generally comprises elastomers, resins, fats and oils, waxes, softeners and inorganic fillers. Elastomers may include polyisobutylene, isobutylene-isoprene copolymer and styrene butadiene rubber, as well as natural latexes such as chicle. Resins include polyvinylacetate and terpene resins. Fats and oils may also be included in the gum base, including tallow, hydrogenated and partially hydrogenated vegetable oils, and cocoa butter. Commonly employed waxes include paraffin, microcrystalline and natural waxes such as beeswax and carnauba. According to the preferred embodiment of the present invention, the insoluble gum base constitutes between about 5 to about 95% by weight of the gum. More preferably the insoluble gum base comprises between 10 and 50 percent by weight of the gum and most preferably about 20 to about 35% by weight of the gum.

The gum base typically also includes a filler component. The filler component may be calcium carbonate, magnesium carbonate, talc, dicalcium phosphate or the like. The filler may constitute between about 5 and about 60% by weight of the gum base. Preferably, the filler comprises about 5 to about 50% by weight of the gum base.

Gum bases typically also contain softeners, including glycerol monostearate and glycerol triacetate. Further, gum bases may also contain optional ingredients such as antioxidants, colors, and emulsifiers. The present invention contemplates employing any commercially acceptable gum base.

The water-soluble portion of the chewing gum may further comprise softeners, sweeteners, flavoring agents and combinations thereof. The sweeteners often fill the role of bulking agents in the gum. The bulking agents generally comprise from about 5% to about 90%, preferably from about 20% to about 80%, and most preferably from about 30% to about 60% of the gum.

Softeners are added to the chewing gum in order to optimize the chewability and mouth feel of the gum. Softeners, also known in the art as plasticizers or plasticizing agents, generally constitute between about 0.5 to about 15.0% by weight of the chewing gum. Softeners contemplated by the present invention include glycerin, lecithin, and combinations thereof. Further, aqueous sweetener solutions such as those containing sorbitol, hydrogenated starch hydrolysates, corn syrup and combinations thereof may be used as softeners and binding agents in gum.

As mentioned above, the palatinose or POS bulk sweetener of the present invention will most likely be used in sugar gum formulations. However, sugar-free formulations are also within the scope of the invention. Sugar sweeteners generally include saccharide-containing components commonly known in the chewing gum art which comprise, but are not limited to, sucrose, dextrose, maltose, dextrin, dried invert sugar, fructose, levulose, galactose, corn syrup solids and the like, alone or in any combination.

The palatinose or POS bulk sweetener of the present invention can also be used in combination with sugarless sweeteners. Generally sugarless sweeteners include components with sweetening characteristics but which are devoid of the commonly known sugars and comprise, but are not limited to, sugar alcohols such as sorbitol, mannitol, xylitol, hydrogenated starch hydrolysates, maltitol and the like, alone or in any combination.

Depending on the particular sweetness release profile and shelf-stability needed, the palatinose or POS solid/-syrup bulk sweeteners of the present invention can also be used in combination with coated or uncoated high-potency sweeteners or with high-potency sweeteners coated with other materials and by other techniques.

A flavoring agent may be present in the chewing gum in an amount within the range of from about 0.1 to about 10.0 weight percent and preferably from about 0.5 to about 3.0 weight percent of the gum. The flavoring agents may comprise essential oils, synthetic flavors, or mixture thereof including, but not limited to, oils derived from plants and fruits such as citrus oils, fruit essences, peppermint oil, spearmint oil, clove oil, oil of wintergreen, anise, and the like. Artificial flavoring components are also contemplated for use in gums of the present invention. Those skilled in the art will recognize that natural and artificial flavoring agents may be combined in any sensorially acceptable blend. All such flavors and flavor blends are contemplated by the present invention.

Optional ingredients such as colors, emulsifiers and pharmaceutical agents may be added to the chewing gum.

In general, chewing gum is manufactured by sequentially adding the various chewing gum ingredients to a commercially available mixer known in the art. After the ingredients have been thoroughly mixed, the gum mass is discharged from the mixer and shaped into the desired form such as by rolling into sheets and cutting into sticks, extruding into chunks or casting into pellets.

Generally, the ingredients are mixed by first melting the gum base and adding it to the running mixer. The base may also be melted in the mixer itself. Color or emulsifiers may also be added at this time. A softener such as glycerin may also be added at this time, along with any syrup and a portion of the bulking agent/sweetener. Further portions of the bulking agent/sweetener may then be added to the mixer. A flavoring agent is typically added with the final portion of the bulking agent. Any high-intensity sweetener used is preferably added after the final portion of bulking agent and flavor have been added.

The entire mixing procedure typically takes from five to fifteen minutes, but longer mixing times may sometimes be required. Those skilled in the art will recognize that many variations of the above described procedure may be followed.

EXAMPLES

The following examples of the invention and comparative examples are provided by way of explanation and illustration.

The formulas listed in Table 1 comprise various sugar-type formulas in which POS can be added to gum after it is dissolved in water and mixed with various aqueous solvents. Aspartame (APM), which can be stabilized with POS, may also be added to the formula. Generally, APM is added to the gum at a level of about 0.005% to about 1% of the gum composition.

Example 1

POS powder can be added directly to the gum.

Example 2

An 80 gram portion of POS can be dissolved in 120 grams of water at 40° C. making a 40% solution and added to gum.

Example 3

POS syrup at 70% solids can be added directly to the gum.

Example 4

A blend of 80 grams of POS and 120 grams of water is mixed at 40° C. To this is added 100 grams of glycerin to give a mixture of 27% POS, 40% water, and 33% glycerin, and added to gum.

Example 5

To 140 grams of POS syrup at 70% solids is added 60 grams of glycerin to give a 70% POS syrup with 30% glycerin, and added to gum.

Example 6

To 140 grams of POS syrup of 70% solids is added 60 grams of propylene glycol giving a 70% POS syrup with 30% glycerin and added to gum.

Example 7

TO 140 grams of POS syrup at 70% solids is added 89 grams of corn syrup and blended giving a mixture of 61% POS syrup and 39% corn syrup.

Example 8

To a 200 gram quantity of corn syrup is added 100 grams of glycerin. To this mixture is added 75 grams of POS and blended at 50° C. This mixture is added to gum.

In the next examples of sugar gum formulations, POS can be dissolved in water and emulsifiers can be added to the aqueous solution. Example solutions can be prepared by dissolving 15 grams of POS in 70 grams water and adding 15 grams of emulsifiers of various hydrophilic-lipophilic balance (HLB) values to the solution.

TABLE 1

| | (WEIGHT PERCENT) | | | | | | | |
|---|---|---|---|---|---|---|---|---|
| | EX. 1 | EX. 2 | EX. 3 | EX. 4 | EX. 5 | EX. 6 | EX. 7 | EX. 8 |
| SUGAR | 55.6 | 56.6 | 55.6 | 47.0 | 53.0 | 53.0 | 55.5 | 47.0 |
| BASE | 19.2 | 19.2 | 19.2 | 19.2 | 19.2 | 19.2 | 19.2 | 19.2 |
| CORN SYRUP | 12.8 | 1.8 | 8.8 | 2.8 | 6.8 | 6.8 | 0.0 | 2.8 |
| PEPPERMINT FLAVOR | 0.9 | 0.9 | 0.9 | 0.9 | 0.9 | 0.9 | 0.9 | 0.9 |
| GLYCERIN | 1.4 | 1.4 | 1.4 | 0.0 | 0.0 | 0.0 | 1.4 | 0.0 |
| LIQUID/POS BLEND | 10.0 | 20.0 | 14.0 | 30.0 | 20.0 | 20.0 | 22.9 | 30.0 |
| APM | 0.1 | 0.1 | 0.1 | 0.1 | 0.1 | 0.1 | 0.1 | 0.1 |

The mixtures can then be used in the following formulas.

TABLE 2

| | (WEIGHT PERCENT) | | | | | |
|---|---|---|---|---|---|---|
| | EX. 9 | EX. 10 | EX. 11 | EX. 12 | EX. 13 | EX. 14 |
| SUGAR | 50.7 | 50.7 | 50.7 | 50.7 | 50.7 | 50.7 |
| BASE | 19.2 | 19.2 | 19.2 | 19.2 | 19.2 | 19.2 |
| CORN SYRUP | 12.8 | 12.8 | 12.8 | 12.8 | 12.8 | 12.8 |
| GLYCERIN | 1.4 | 1.4 | 1.4 | 1.4 | 1.4 | 1.4 |
| DEXTROSE MONOHYDRATE | 9.9 | 9.9 | 9.9 | 9.9 | 9.9 | 9.9 |
| PEPPERMINT FLAVOR | 0.9 | 0.9 | 0.9 | 0.9 | 0.9 | 0.9 |

TABLE 2-continued

| | (WEIGHT PERCENT) | | | | | |
|---|---|---|---|---|---|---|
| | EX. 9 | EX. 10 | EX. 11 | EX. 12 | EX. 13 | EX. 14 |
| APM | 0.1 | 0.1 | 0.1 | 0.1 | 0.1 | 0.1 |
| BULK SWEETENER/ EMULSIFIER/WATER MIXTURE | 5.0 | 5.0 | 5.0 | 5.0 | 5.0 | 5.0 |
| | None | HLB = 2 | HLB = 4 | HLB = 6 | HLB = 9 | HLB = 12 |

Examples 15–20

The same as the formulations made in Examples 9–14, respectively, except that the flavor can be mixed together with the aqueous bulk sweetener solution and emulsified before adding the mixture to the gum batch.

The following Tables 3 through 10 are examples of gum formulations that demonstrate formula variations in which palatinose oligosaccharides (POS) may be used. Formulas with high levels of POS may also contain aspartame (APM) which is stabilized with POS.

Examples 21–25 in Table 3 demonstrate the use of POS in low moisture sugar formulations showing less than 2% theoretical moisture:

TABLE 3

| | (WEIGHT PERCENT) | | | | |
|---|---|---|---|---|---|
| | EX. 21 | EX. 22 | EX. 23 | EX. 24 | EX. 25 |
| SUGAR | 57.9 | 53.9 | 48.9 | 25.0 | 0.0 |
| GUM BASE | 19.2 | 19.2 | 19.2 | 19.2 | 19.2 |
| CORN SYRUP[a] | 6.0 | 6.0 | 6.0 | 6.0 | 6.0 |
| DEXTROSE MONOHYDRATE | 10.0 | 10.0 | 10.0 | 10.0 | 10.0 |
| LACTOSE | 0.0 | 0.0 | 0.0 | 5.0 | 5.0 |
| GLYCERIN[b] | 5.0 | 5.0 | 4.9 | 8.7 | 8.6 |
| FLAVOR | 0.9 | 0.9 | 0.9 | 0.9 | 0.9 |
| POS | 1.0 | 5.0 | 10.0 | 25.0 | 50.0 |
| APM | — | — | 0.1 | 0.2 | 0.3 |

[a]Corn Syrup is evaporated to 85% solids, 15% moisture
[b]Glycerin and syrup may be blended and co-evaporated Examples 26–30 in Table 4 demonstrate the use of POS in medium-moisture sugar formulations having about 2% to about 5% moisture.

Examples 31–35 in Table 5 demonstrate the use of POS in high-moisture sugar formulations having more than about 5% moisture.

TABLE 4

| | (WEIGHT PERCENT) | | | | |
|---|---|---|---|---|---|
| | EX. 26 | EX. 27 | EX. 28 | EX. 29 | EX. 30 |
| SUGAR | 52.5 | 48.5 | 43.5 | 25.0 | 0.0 |
| GUM BASE | 19.2 | 19.2 | 19.2 | 19.2 | 19.2 |
| CORN SYRUP[a] | 15.0 | 15.0 | 14.9 | 18.3 | 18.2 |
| DEXTROSE MONOHYDRATE | 10.0 | 10.0 | 10.0 | 10.0 | 10.0 |
| GLYCERIN[b] | 1.4 | 1.4 | 1.4 | 1.4 | 1.4 |
| FLAVOR | 0.9 | 0.9 | 0.9 | 0.9 | 0.9 |
| POS | 1.0 | 5.0 | 10.0 | 25.0 | 50.0 |
| APM | — | — | 0.1 | 0.2 | 0.3 |

[a]Corn Syrup is evaporated to 85% solids, 15% moisture
[b]Glycerin and syrup may be blended and co-evaporated

TABLE 5

| | (WEIGHT PERCENT) | | | | |
|---|---|---|---|---|---|
| | EX. 31 | EX. 32 | EX. 33 | EX. 34 | EX. 35 |
| SUGAR | 50.0 | 46.0 | 41.0 | 25.0 | 0.0 |
| GUM BASE | 24.0 | 24.0 | 24.0 | 24.0 | 24.0 |
| CORN SYRUP | 24.0 | 24.0 | 23.9 | 24.4 | 24.3 |
| GLYCERIN | 0.0 | 0.0 | 0.0 | 0.4 | 0.4 |
| FLAVOR | 1.0 | 1.0 | 1.0 | 1.0 | 1.0 |
| POS | 1.0 | 5.0 | 10.0 | 25.0 | 50.0 |
| APM | — | — | 0.1 | 0.2 | 0.3 |

Examples 36–40 in Table 6 and Examples 41–50 in Tables 7 and 8 demonstrate the use of POS in low- and high-moisture gums that are sugar-free. Low-moisture gums have less than about 2% moisture, and high-moisture gums have greater than 2% moisture.

TABLE 6

| | (WEIGHT PERCENT) | | | | |
|---|---|---|---|---|---|
| | EX. 36 | EX. 37 | EX. 38 | EX. 39 | EX. 40 |
| BASE | 25.5 | 25.5 | 25.5 | 25.5 | 25.5 |
| SORBITOL | 50.0 | 46.0 | 41.0 | 26.0 | 0.0 |
| MANNITOL | 12.0 | 12.0 | 12.0 | 12.0 | 13.0 |
| GLYCERIN | 10.0 | 10.0 | 9.9 | 9.8 | 9.7 |
| FLAVOR | 1.5 | 1.5 | 1.5 | 1.5 | 1.5 |
| POS | 1.0 | 5.0 | 10.0 | 25.0 | 50.0 |
| APM | — | — | 0.1 | 0.2 | 0.3 |

TABLE 7

| | (WEIGHT PERCENT) | | | | |
|---|---|---|---|---|---|
| | EX. 41 | EX. 42 | EX. 43 | EX. 44 | EX. 45 |
| BASE | 25.5 | 25.5 | 25.5 | 25.5 | 25.5 |
| SORBITOL | 50.0 | 46.0 | 41.0 | 26.0 | 0.0 |
| LIQUID SORBITOL* | 10.0 | 10.0 | 10.0 | 10.0 | 11.0 |
| MANNITOL | 10.0 | 10.0 | 10.0 | 10.0 | 10.0 |
| GLYCERIN | 2.0 | 2.0 | 1.9 | 1.8 | 1.7 |
| FLAVOR | 1.5 | 1.5 | 1.5 | 1.5 | 1.5 |
| POS | 1.0 | 5.0 | 10.0 | 25.0 | 50.0 |
| APM | — | — | 0.1 | 0.2 | 0.3 |

*Sorbitol liquid contains 70% sorbitol, 30% water

TABLE 8

| | (WEIGHT PERCENT) | | | | |
|---|---|---|---|---|---|
| | EX. 46 | EX. 47 | EX. 48 | EX. 49 | EX. 50 |
| BASE | 25.5 | 25.5 | 25.5 | 25.5 | 25.5 |
| SORBITOL | 50.0 | 46.0 | 41.0 | 26.0 | 0.0 |
| HSH SYRUP* | 10.0 | 10.0 | 10.0 | 10.0 | 10.0 |
| MANNITOL | 8.0 | 8.0 | 7.9 | 7.8 | 8.7 |
| GLYCERIN** | 4.0 | 4.0 | 4.0 | 4.0 | 4.0 |
| FLAVOR | 1.5 | 1.5 | 1.5 | 1.5 | 1.5 |
| POS | 1.0 | 5.0 | 10.0 | 25.0 | 50.0 |
| APM | — | — | 0.1 | 0.2 | 0.3 |

*Hydrogenated starch hydrolyzole syrup
**Glycerin and HSH syrup may be blended or co-evaporated Table 9 shows sugar chewing gum formulations that can be made with various other types of sugars.

TABLE 9

| | EX. 51 | EX. 52 | EX. 53 | EX. 54 | EX. 55 | EX. 56 | EX. 57 | EX. 58 | EX. 59 | EX. 60 | EX. 61 | EX. 62 |
|---|---|---|---|---|---|---|---|---|---|---|---|---|
| | (WEIGHT PERCENT) | | | | | | | | | | | |
| GUM BASE | 19.2 | 19.2 | 19.2 | 19.2 | 19.2 | 19.2 | 19.2 | 19.2 | 19.2 | 19.2 | 19.2 | 19.2 |
| SUCROSE | 44.4 | 24.2 | 39.4 | 19.2 | 29.4 | 19.2 | 29.4 | 19.2 | 29.4 | 19.2 | 37.4 | 22.2 |
| GLYCERIN | 1.4 | 1.4 | 1.4 | 1.4 | 1.4 | 1.4 | 1.4 | 1.4 | 1.4 | 1.4 | 1.4 | 1.4 |
| CORN SYRUP | 14.0 | 14.0 | 14.0 | 14.0 | 14.0 | 14.0 | 14.0 | 14.0 | 14.0 | 14.0 | 11.0 | 11.0 |
| DEXTROSE | 5.0 | 5.0 | — | — | 10.0 | 5.0 | 10.0 | 5.0 | 10.0 | 5.0 | 10.0 | 5.0 |
| LACTOSE | 5.0 | 5.0 | 10.0 | 10.0 | — | — | — | — | — | — | — | — |
| FRUCTOSE | 5.0 | 5.0 | 10.0 | 10.0 | 10.0 | 5.0 | 10.0 | 5.0 | 10.0 | 5.0 | 5.0 | 5.0 |
| INVERT SUGAR | — | — | — | — | 10.0 | 10.0 | 10.0 | 10.0 | — | — | 5.0 | 5.0 |
| MALTOSE | — | — | — | — | — | — | — | — | 10.0 | 10.0 | — | — |
| CORN SYRUP SOLIDS | — | — | — | — | — | — | — | — | — | — | 5.0 | 5.0 |
| PEPPERMINT FLAVOR | 0.9 | 0.9 | 0.9 | 0.9 | 0.9 | 0.9 | 0.9 | 0.9 | 0.9 | 0.9 | 0.9 | 0.9 |
| POS | 5.0 | 25.0 | 5.0 | 25.0 | 5.0 | 25.0 | 5.0 | 25.0 | 5.0 | 25.0 | 5.0 | 25.0 |
| APM | 0.1 | 0.3 | 0.1 | 0.3 | 0.1 | 0.3 | 0.1 | 0.3 | 0.1 | 0.3 | 0.1 | 0.3 |

Any of the sugars may be combined with POS and co-dried to form unique combinations such as:

Example 63

Dextrose and POS can be dissolved in water in a 2:1 ratio dextrose:POS and co-dried or co-precipitated and used in the formulas in Table 9.

Example 64

POS and sucrose can be dissolved in water in a 1:1 ratio and co-dried or co-precipitated and used in the formulas in Table 9.

Example 65

POS, sucrose, and dextrose can be dissolved in water in a 1:1:1 ratio and co-dried or co-precipitated and used in the formulas in Table 9.

Example 66

POS, sucrose, dextrose, and fructose can be dissolved in water at 25% of each ingredient and co-dried, and used in the formulas in Table 9.

Example 67

POS, dextrose, fructose, and lactose can be dissolved in water at 25% of each ingredient and co-dried, and used in the formulas in Table 9.

Example 68

POS, dextrose, maltose, and corn syrup solids can be dissolved in water at 25% of each ingredient and co-dried, and used in the formulas in Table 9.

Example 69

POS, sucrose, dextrose, maltose and fructose can be dissolved in water at 20% of each ingredient and co-dried, and used in the formulas in Table 9.

Multiple combinations of POS with other sugars can be made in solution to form liquid concentrates that do not need to be co-dried, such as:

Example 70

POS, corn syrup and glycerin can be dissolved in water at a ratio of 1:1:1, evaporated to a thick syrup and used in the formulas in Table 9.

Example 71

POS, dextrose, fructose, invert syrup may be dissolved in water at 25% of each ingredient and evaporated to a thick syrup and used in the formulas in Table 9.

Example 72

POS, dextrose, maltose, and corn syrup solids may be dissolved in water at 25% of each component and evaporated to a thick syrup and used in the formulas in Table 9.

Example 73

Glycerin is added to Example 71 at a ratio of 4:1 syrup to glycerin and evaporated to a thick syrup, and used in the formulas in Table 9.

Example 74

Glycerin is added to Example 72 at a ratio of 2:1 syrup to glycerin and evaporated to a thick syrup, and used in the formulas in Table 9.

Table 10 shows chewing gum formulations that are free of sugar. These formulations can use a wide variety of non-sugar alditols, including Lycasin brand

TABLE 10

| | EX. 75 | EX. 76 | EX. 77 | EX. 78 | EX. 79 | EX. 80 | EX. 81 | EX. 82 | EX. 83 | EX. 84 | EX. 85 | EX. 86 |
|---|---|---|---|---|---|---|---|---|---|---|---|---|
| | (WEIGHT PERCENT) | | | | | | | | | | | |
| GUM BASE | 25.5 | 25.5 | 25.5 | 25.5 | 25.5 | 25.5 | 25.5 | 25.5 | 25.5 | 25.5 | 25.5 | 25.5 |
| GLYCERIN | 1.9 | 1.7 | 1.9 | 1.7 | 1.9 | 1.7 | 7.9 | 7.7 | 7.9 | 1.7 | 2.7 | 1.7 |
| SORBITOL | 44.0 | 14.0 | 34.0 | 9.0 | 28.0 | — | 32.0 | 7.0 | 22.0 | 11.0 | 10.0 | — |
| MANNITOL | — | 10.0 | 10.0 | 10.0 | 10.0 | 6.0 | 8.0 | 8.0 | 8.0 | — | — | — |
| SORBITOL LIQUID | 17.0 | 17.0 | — | — | — | — | 5.0 | — | — | — | — | — |
| LYCASIN | — | — | 17.0 | 12.0 | 8.0 | 10.0 | — | 5.0 | 5.0 | 5.0 | 10.0 | 10.0 |
| MALTITOL | — | — | — | 10.0 | — | — | — | 5.0 | — | — | — | — |
| XYLITOL | — | — | — | — | 15.0 | 15.0 | — | — | — | 15.0 | — | — |
| LACTITOL | — | — | — | — | — | — | 10.0 | 10.0 | 10.0 | — | — | — |
| PALATINIT | — | — | — | — | — | — | — | — | 10.0 | 10.0 | 25.0 | 21.0 |
| FLAVOR | 1.5 | 1.5 | 1.5 | 1.5 | 1.5 | 1.5 | 1.5 | 1.5 | 1.5 | 1.5 | 1.5 | 1.5 |

TABLE 10-continued

| | (WEIGHT PERCENT) | | | | | | | | | | | |
|---|---|---|---|---|---|---|---|---|---|---|---|---|
| | EX. 75 | EX. 76 | EX. 77 | EX. 78 | EX. 79 | EX. 80 | EX. 81 | EX. 82 | EX. 83 | EX. 84 | EX. 85 | EX. 86 |
| POS | 10.0 | 30.0 | 10.0 | 30.0 | 10.0 | 40.0 | 10.0 | 30.0 | 10.0 | 30.0 | 25.0 | 40.0 |
| APM | 0.1 | 0.3 | 0.1 | 0.3 | 0.1 | 0.3 | 0.1 | 0.3 | 0.1 | 0.3 | 0.3 | 0.3 |

Any of the alditols can be combined with POS and co-dried to form unique combinations, such as:

Example 87

POS and sorbitol can be dissolved in water in a ratio of 2:1 sorbitol:
POS and co-dried and used in formulas in Table 10.

Example 88

POS, sorbitol, and mannitol can be dissolved in water at a ratio of 1:1:1, co-dried, and used in appropriate formulas in Table 10.

Example 89

POS, mannitol and xylitol can be dissolved in water at a ratio of 1:1:1, co-dried, and used in appropriate formulas in Table 10.

Example 90

POS, sorbitol, and lactitol can be dissolved in water at a ratio of 1:1:1, co-dried, and used in appropriate formulas in Table 10.

Example 91

POS, palatinit, and sorbitol can be dissolved in water at a ratio of 1:1:1, co-dried, and used in appropriate formulas in Table 10.

Example 92

POS and palatinit can be dissolved in water at a ratio of 1:1, co-dried, and used in appropriate formulas in Table 10.

Example 93

POS, sorbitol, maltitol, and xylitol may be blended at 25% of each ingredient and dissolved in water, co-dried, and used in appropriate formulas in Table 10.

Multiple combinations of palatinose with the various alditols can be made in solution to form liquid concentrates that do not need to be co-dried, such as:

Example 94

POS, sorbitol, maltitol, and Lycasin may be dissolved in water at 25% of each ingredient, evaporated to a thick syrup and used in the appropriate formulas in Table 10.

Example 95

POS, xylitol, sorbitol, and Lycasin can be dissolved in water at 25% of each ingredient, evaporated to a thick syrup, and used in the formulas in Table 10.

Example 96

POS, sorbitol, lactitol, and Lycasin can be dissolved in water at 25% of each ingredient, evaporated to a thick syrup, and used in the formulas in Table 10.

Example 97

POS, Lycasin and glycerin can be dissolved in water at a ratio of 1:1:1, evaporated to a thick syrup and used in the formulas in Table 10.

Example 98

Glycerin is added to Example 94 at a ratio of 4:1 syrup to glycerin, evaporated to a thick syrup, and used in formulas in Table 10.

Example 99

Glycerin is added to Example 95 at a ratio of 4:1 syrup to glycerin, evaporated to a thick syrup, and used in the formulas in Table 10.

Example 100

Glycerin is added to Example 96 at a ratio of 4:1 syrup to glycerin, evaporated to a thick syrup, and used in formulas in Table 10.

Other high-intensity sweeteners such as acesulfame K, or the salts of acesulfame, cyclamate and its salts, saccharin and its salts, alitame, sucralose, thaumtin, monellin, dihydrochalcone, stevioside, glycyrrhizin, and combinations thereof may be used in any of the Examples listed in Tables 3, 4, 5, 6, 7, 8 9 and 10. Since POS has less sweetness than some of the other sugars used in sugar gum, and some of the alditols in sugar-free gum, a high-intensity sweetener may be need to obtain the proper level of sweetness.

High-intensity sweeteners may also be modified to control their release in chewing gum formulations containing POS. This can be controlled by various methods of encapsulation, agglomeration, absorption, or a combination of methods to obtain either a fast or slow release of the sweetener. Sweetener combinations, some of which may be synergistic, may also be included in the gum formulations containing POS.

The following examples show the use of high-intensity sweeteners in chewing gum formulations with POS.

Example 101

Alitame at a level of 0.03% may be added to any of the formulas in Tables 3 through 10 by replacing 0.03% of the POS.

Example 102

Sucralose at a level of 0.07% may be added to any of the formulas in Tables 3 through 10 by replacing 0.07% of the POS.

Example 103

Thaumatin at a level of 0.02% may be added to any of the formulas in Tables 3 through 10 by replacing 0.02% of the POS.

Example 104

Glycyrrhizin at a level of 0.4% may be added to any of the formulas in Tables 3 through 10 by replacing 0.4% of the POS.

High-intensity sweeteners may also be combined with other high-intensity sweeteners, with or without encapsulation, agglomeration or absorption, and used in chewing gum. Examples are:

Example 105

Aspartame and acesulfame K at a 1:1 ratio may be added to any of the formulas in Tables 3 through 10 at a level of 0.15% by replacing 0.15% of the POS.

Example 106

Aspartame and alitame at a ratio of 9:1 aspartame: alitame may be added to any of the formulas in Tables 3 through 10 at a level of 0.1% by replacing 0.1% of the POS.

Example 107

Aspartame and thaumatin at a ratio of 9:1 aspartame:thaumatin can be added to any of the formulas in Tables 3 through 10 at a level of 0.1% by replacing 0.1% of the POS.

Example 108

Sucralose and alitame in a ratio of 3:1 sucralose: alitame can be added to any of the formulas in Tables 3 through 10 at a level of 0.5% by replacing 0.5% of the POS.

Example 109

Alitame and glycyrrhizin in a ratio of 1:12 alitame:glycyrrhizin can be added to any of the formulas in Tables 3 through 10 at a level of 0.1% by replacing 0.1% of the POS.

Example 110

Aspartame and glycyrrhizin in a ratio of 1:14 aspartame:glycyrrhizin can be added to any of the formulas in Tables 3 through 10 at a level of 0.3% by replacing 0.3% of the POS.

As discussed above, the three types of palatinose ingredients that are available are palatinose crystalline, palatinose syrup, and palatinose-oligosaccharide (POS). These materials may be used exclusively in a variety of chewing gum formulations, as in Tables 11 and 12. The formulas with POS and APM will show improved APM stability.

TABLE 11

| | (WEIGHT PERCENT) | | | | |
|---|---|---|---|---|---|
| | EX. 111 | EX. 112 | EX. 113 | EX. 114 | EX. 115 |
| GUM BASE | 19.2 | 25.5 | 25.5 | 25.5 | 40.0 |
| GLYCERIN | 1.7 | 1.7 | 6.7 | 6.7 | 1.7 |
| PALATINOSE CRYSTALLINE | 57.8 | 46.0 | 41.0 | 41.0 | 35.5 |
| PALATINOSE SYRUP* | 10.0 | 20.0 | 5.0 | — | 10.0 |
| POS | 10.0 | 5.0 | 20.0 | 25.0 | 10.0 |
| FLAVOR | 1.0 | 1.5 | 1.5 | 1.5 | 2.5 |
| APM | 0.3 | 0.3 | 0.3 | 0.3 | 0.3 |

*Palatinose syrup may be preblended with glycerin and coevaporated to reduce moisture.

TABLE 12

| | (WEIGHT PERCENT) | | | | | |
|---|---|---|---|---|---|---|
| | EX. 116 | EX. 117 | EX. 118 | EX. 119 | EX. 120 | EX. 121 |
| GUM BASE | 25.5 | 25.5 | 25.5 | 25.5 | 50.0 | 70.0 |
| GLYCERIN | 1.7 | 1.7 | 6.7 | 14.7 | 1.6 | 0.6 |
| PALATINOSE CRYSTALLINE | 51.0 | 61.0 | 26.0 | 28.0 | 35.5 | 20.0 |
| PALATINOSE SYRUP* | 20.0 | 10.0 | 20.0 | — | 10.0 | 4.0 |
| POS | — | — | 20.0 | 30.0 | — | 2.0 |
| FLAVOR | 1.5 | 1.5 | 1.5 | 1.5 | 2.5 | 3.0 |
| APM | 0.3 | 0.3 | 0.3 | 0.3 | 0.4 | 0.4 |

*Palatinose syrup may be preblended with glycerin and coevaporated to reduce moisture.

The formulation in Table 11 and 12 do not contain other sugars or alditols. These formulations will give unique texture and flavor attributes. These formulations may also contain other high-intensity, artificial sweeteners, from about 0.02% to about 0.1% for sweeteners like alitame, thaumatin, and dihydrochalcone, and from about 0.1% to about 0.3% for sweeteners like sucralose, acesulfame, and saccharin. The formulations in Tables 11 and 12 without the other types of sugars and alditols will also have good noncariogenic properties.

Examples 122-125

The following gum formulations were made:

| | EX. 122 | EX. 123 | EX. 124 | EX. 125 |
|---|---|---|---|---|
| BASE | 27.0 | 27.0 | 27.0 | 27.0 |
| SORBITOL | 40.2 | 38.7 | 32.5 | 20.9 |
| MANNITOL | 12.0 | 11.5 | 9.7 | 6.3 |
| GLYCERIN | 8.1 | 8.1 | 8.1 | 8.1 |
| SORBITOL LIQUID | 11.0 | 11.0 | 11.0 | 11.0 |
| PEPPERMINT FLAVOR | 1.3 | 1.3 | 1.3 | 1.3 |
| COLOR | 0.1 | 0.1 | 0.1 | 0.1 |
| APM | 0.3 | 0.3 | 0.3 | 0.3 |
| PALATINOSE | 0 | 2.0 | 10.0 | 25.0 |

These formulas were made in a conventional lab mixer in a conventional manner on a lab scale and formed into square pellets. Samples of each formula were placed in six sealed pouches and stored at 85° F. for 0, 1, 2, 4, 6 and 8 weeks. Samples were then removed and analyzed for APM to determine degradation. The test results are shown in FIG. 1. The test results show virtually no increase in stability of APM with palatinose levels as high as 25%.

Examples 126-133

The following gum formulations were made:

|  | EX. 126 | EX. 127 | EX. 128 | EX. 129 | EX. 130 | EX. 131 | EX. 132 | EX. 133 |
| --- | --- | --- | --- | --- | --- | --- | --- | --- |
| BASE | 24.7 | 24.7 | 24.7 | 24.7 | 24.7 | 24.7 | 24.7 | 24.7 |
| SORSITOL | 50.0 | 50.0 | 35.0 | 10.0 | 35.0 | 10.0 | 35.0 | 10.0 |
| MANNITOL | 9.4 | 7.0 | 9.4 | 9.4 | 7.0 | 7.0 | 9.0 | 9.0 |
| GLYCERIN | 2.0 | 2.0 | 2.0 | 2.0 | 2.0 | 2.0 | 2.0 | 2.0 |
| LECITHIN | 0.2 | 0.2 | 0.2 | 0.2 | 0.2 | 0.2 | 0.2 | 0.2 |
| PEPPERMINT FLAVOR | 1.4 | 1.4 | 1.4 | 1.4 | 1.4 | 1.4 | 1.4 | 1.4 |
| APM | 0.3 | 0.3 | 0.3 | 0.3 | 0.3 | 0.3 | 0.3 | 0.3 |
| LYCASIN | — | 14.4 | — | — | 14.4 | 14.4 | — | — |
| LIQUID SORBITOL | 12.0 | — | 12.0 | 12.0 | — | — | — | — |
| POS | — | — | 15.0 | 40.0 | 15.0 | 40.0 | 15.0 | 40.0 |
| PALATINOSE SYRUP | — | — | — | — | — | — | 12.4 | 12.4 |

Figure 2:
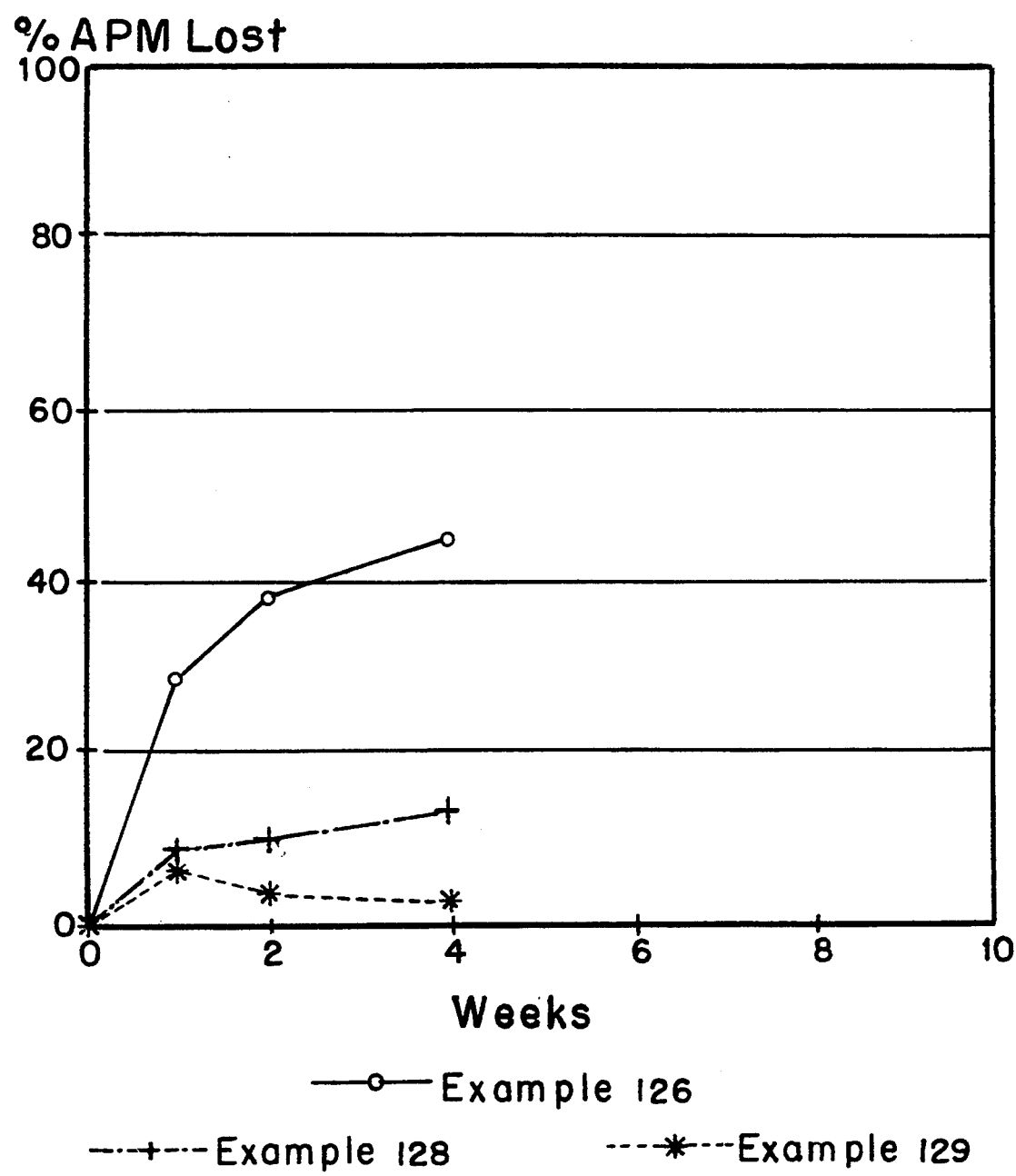
FIG. 2 shows test results of aspartame stability for gum made with sorbitol liquid and POS.
Figure 3:
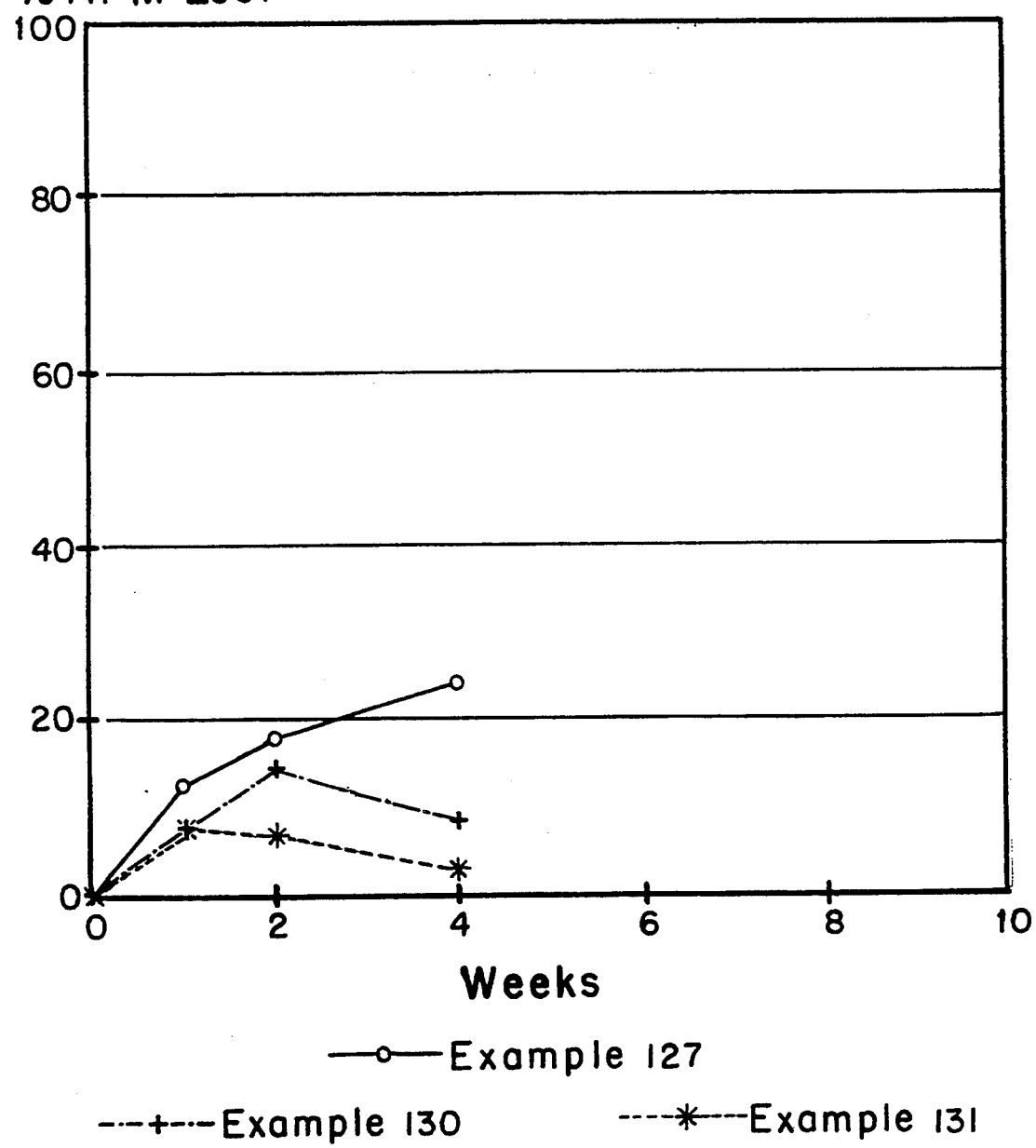
FIG. 3 shows test results of aspartame stability for gum made with HSH syrup and POS.

These formulas were made in a conventional lab mixer in a conventional manner and formed into square pellets. Samples of each formula were placed in four sealed pouches and stored at 85° F. for 0, 1, 2, and 4 weeks. Samples were then removed and analyzed for APM to determine degradation. The test results are shown in FIGS. 2 and 3 for gum made with sorbitol liquid and Lycasin brand HSH syrup, respectively. Results show that in both types of formulations, POS improves APM stability significantly as compared to when palatinose is used in the same type of formulation in FIG. 1. As seen in both FIGS. 2 and 3, after four weeks of storage at 85° F., over 80% of the originally formulated amount of aspartame remained undecomposed in the gum formulas that included POS.

Example 134

The following sugar gum center formulation was made:

|  | % |
| --- | --- |
| Base | 24.8 |
| Sugar | 52.0 |
| Corn Syrup | 22.4 |
| Peppermint Flavor | 0.8 |

This formulation was made in a 25 gallon standard gum mixer and sheeted as rectangular pellets for coating tests.

Two starch solutions were prepared using 10% starch in an aqueous solution. In the first solution, Amylotex brand starch was used. Tex-0-Film brand starch was used in the second solution. Both starches are available from National Starch Co. and both are modified starches, with Tex-O-Film being a thin boiling starch. A coating syrup was prepared by mixing 1,000 grams of a 75% palatinose solution, heated until the palatinose dissolved, 120 grams of the 10% Amylotex solution and 120 grams of the 10% Tex-O-Film solution.

This syrup was used to coat 1000 grams of the above sugar pellets. The first two coats each used about 15 grams of coating syrup. These two coats made the gum very sticky. After each of the next 3-7 coats, about 4 grams of powdered palatinose was applied to dry each coat and reduce sticking. After this, coating with palatinose solution was similar to coating with a 75% sugar solution. Additional syrup coatings were added until the coating reached about 35% of the total product weight.

The final coated product had a hard, crunchy shell, very similar to a sucrose-type hard shell. The appearance was slightly grayer and slightly rougher. The flavor had a creamy character, but was much less sweet than a comparable sugar coating.

It should be appreciated that the compositions and methods of the present invention are capable of being incorporated in the form of a variety of embodiments, only a few of which have been illustrated and described above. The invention may be embodied in other forms without departing from its spirit or essential characteristics. The described embodiments are to be considered in all respects only as illustrative and not restrictive, and the scope of the invention, therefore, is indicated by the appended claims rather than by the foregoing description. All changes which come within the meaning and range of equivalency of the claims are to be embraced within their scope.

We claim:

1. A chewing gum product having a rolling compound thereon, the rolling compound comprising palatinose, palatinose oligosaccharide or mixture thereof.

2. The chewing gum product of claim 1 wherein the palatinose, palatinose oligosaccharide or mixture thereof comprises from about 0.5% to 100% of the rolling compound.

3. The chewing gum product of claim 1 wherein the palatinose, palatinose oligosaccharide or mixture thereof comprises from about 0.005% to about 5% of the chewing gum product.

4. A chewing gum composition comprising a high-intensity sweetener encapsulated with palatinose oligosaccharide.

5. A chewing gum composition comprising a flavor encapsulated with palatinose oligosaccharide.

6. A chewing gum product having a liquid center wherein the liquid center comprises palatinose, palatinose oligosaccharide or a mixture thereof.

7. A method of making chewing gum comprising the steps of:
   a) co-drying a solution containing palatinose, palatinose oligosaccharide or a mixture thereof and another sweetener selected from the group consisting of sugar sweeteners, alditol sweeteners and high-intensity sweeteners, and
   b) mixing the co-dried sweeteners with gum base and flavoring agents to produce a gum composition.

8. A method of making chewing gum comprising the steps of:
   a) co-evaporating an aqueous solution comprising palatinose, palatinose oligosaccharide or a mixture thereof and a plasticizing agent to form a syrup, and
   b) mixing the syrup with gum base, bulking agents and flavoring agents to produce a gum composition.

9. The method of claim 8 wherein the plasticizing agent is selected from the group consisting of glycerin, propylene glycol and mixtures thereof.

10. A chewing gum composition comprising:
a) about 5% to about 95% gum base;
b) about 0.1% to about 10% of a flavoring agent,
c) about 5% to about 90% bulking agent, the bulking agent comprising at least in part palatinose, and
d) sweetening amounts of aspartame.

* * * * *

UNITED STATES PATENT AND TRADEMARK OFFICE
CERTIFICATE OF CORRECTION

PATENT NO. : 5,399,365
DATED      : March 21, 1995
INVENTOR(S): Yatka et al.

It is certified that error appears in the above-identified patent and that said Letters Patent is hereby corrected as shown below:

In the Title Page

In column 1, under "U.S. PATENT DOCUMENTS" please delete line 3 in its entirety.

In column 2, line 24, after "Steven P. Shurtz", please add --Willian Brinks Hofer Gilson & Lione--.

On page 2, column 1, under "U.S. PATENT DOCUMENTS", after line 10, please insert the following line:

--5,087,460    2/1992    Cherukuri et al.    426/5--.

In column 10, line 31, replace "TO" with --To--.

In column 14, line 51, add --HSH syrup.-- at the end of the line.

In column 15, make line 14 a continuation of line 13.

UNITED STATES PATENT AND TRADEMARK OFFICE
CERTIFICATE OF CORRECTION

PATENT NO. : 5,399,365
DATED : March 21, 1995
INVENTOR(S) : Yatka et al.

It is certified that error appears in the above-identified patent and that said Letters Patent is hereby corrected as shown below:

In column 16, line 27, replace "thaumtin" with --thaumatin--.

In column 16, line 31, please delete spaces before "POS" and make this line a continuation of line 30.

In column 19, line 3, replace "SORSITOL" with --SORBITOL--.

Signed and Sealed this

Eighth Day of June, 1999

Q. TODD DICKINSON

Attest:

Attesting Officer

Acting Commissioner of Patents and Trademarks